INVENTOR
MARCEL MENNESSON
BY Lucke & Lucke
ATTORNEY

INVENTOR
MARCEL MENNESSON
BY Lucke & Lucke
ATTORNEY

Patented Jan. 31, 1950

2,495,859

UNITED STATES PATENT OFFICE 2,495,859

FRAME FOR BICYCLES

Marcel Mennesson, Neuilly-sur-Seine, France, assignor to Societe d'Appareils de Controle et d'Equipement des Moteurs (S. A. C. E. M.), Neuilly-sur-Seine, France, a limited-liability company of France Application August 25, 1947, Serial No. 770,459
In France September 3, 1946

3 Claims. (Cl. 280—281)

The present invention relates to frames for bicycles and other light vehicles, in particular vehicles fitted with an auxiliary engine, these frames being of the kind referred to in French Patent No. 898,439 and including an open frame bent main tube as short as possible which connects the steering head tube with the saddle tube and to which are connected, by electric spot welding, sheet metal elements carrying the crank hanger.

Generally the frames of bicycles or like vehicles are constituted by steel or aluminium tubes connected together by brazed or welded couplings or by autogenous welding. These methods of assembly are costly.

The chief object of the present invention is to simplify the manufacture of frames of this kind so that it is possible to replace some of the tube elements that are usually employed by sheet metal elements which can be assembled by bolts or screws, thus excluding brazing or autogenous welding.

A preferred embodiment of my invention will be hereinafter described with reference to the accompanying drawings, given merely by way of example and in which.

Figure 3:
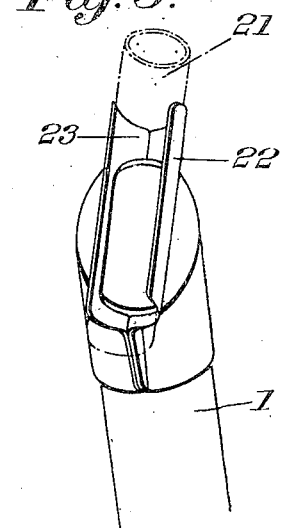
Figure 4:
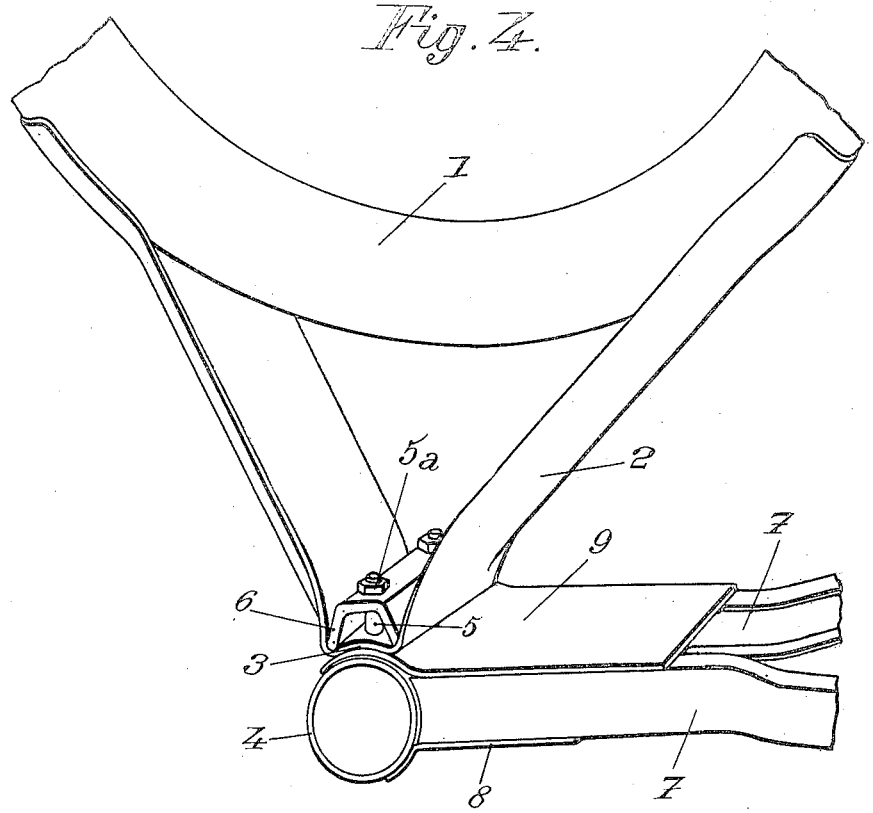
Figure 5:
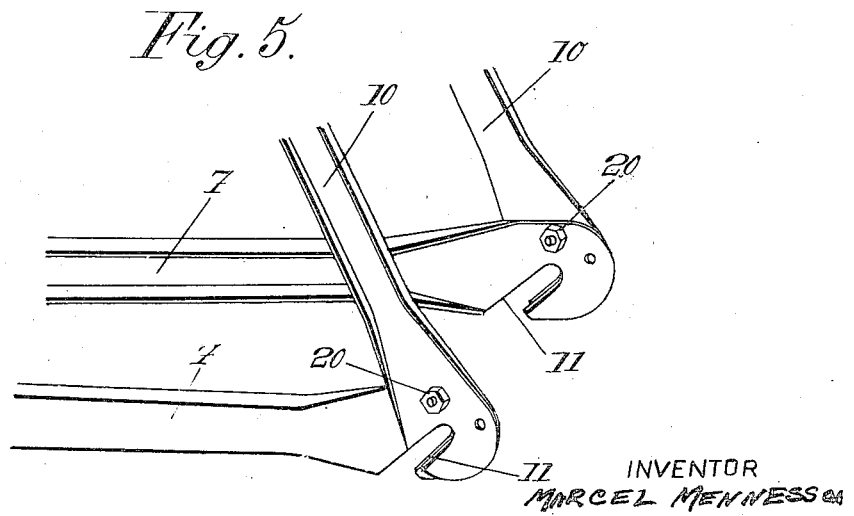

Fig. 3 similarly shows the connection between the bent main tube and the steering head tube of the frame;

Fig. 4 shows, in perspective view, the fixation of the crank hanger housing to the other parts of the frame;

Fig. 5 similarly shows the frame portions close to the housing of the rear wheel spindle.

The frame shown by the drawing includes a bent main tube 1 intended to connect the steering head tube with the saddle tube and made of such dimensions, in transverse section, that it can resist, by itself, the torsional and bending stresses that develop, between the rear wheel, the front wheel and the crank hanger.

To the under face of the rear portion of said tube 1, I secure a V-shaped piece 2, of pressed sheet metal, preferably of U-shaped cross section, with ends adapted to fit on the main tube 1. The curvature of tube 1 and its inner diameter are such that they make it possible to introduce thereinto one electrode of a spot welding machine. This welding operation is performed, of course, before the tube is subsequently deformed, to permit the mounting of the complete frame, as hereinafter explained.

Piece 2 includes, at the apex of the V it forms, a relatively flat portion 3 of a shape corresponding to that of the tube 4 intended to receive the bearings of the crank hanger, this tube 4 being preferably fixed on piece 2 by means of bolts 5. Advantageously I interpose between nuts 5a screwed on bolts 5 and the upper face of the flat portion 3 of piece 2, a spring part 6, in the shape of an inverted V, constituted by a bent piece of metal bearing upon said flat portion 3 along lines parallel to the axis of the crank hanger.

The tube 4 of the crank hanger is connected through two symmetrical rods 7, of U-shaped cross section (Fig. 4), to the rear wheel spindle, the connection with said tube being ensured by two plates 8 and 9 electrically welded to tube 4 and to the horizontal wings of said pieces 7. Welding is facilitated by the relatively large area of the contact surfaces between these different pieces. At their rear ends, the horizontal wings of pieces 7 are flattened or cut into bevelled shape, as shown by Fig. 5, to make it possible to assemble them with the rear strut rods 10 and provide the housings 11 for the rear wheel spindle.

Figure 1:
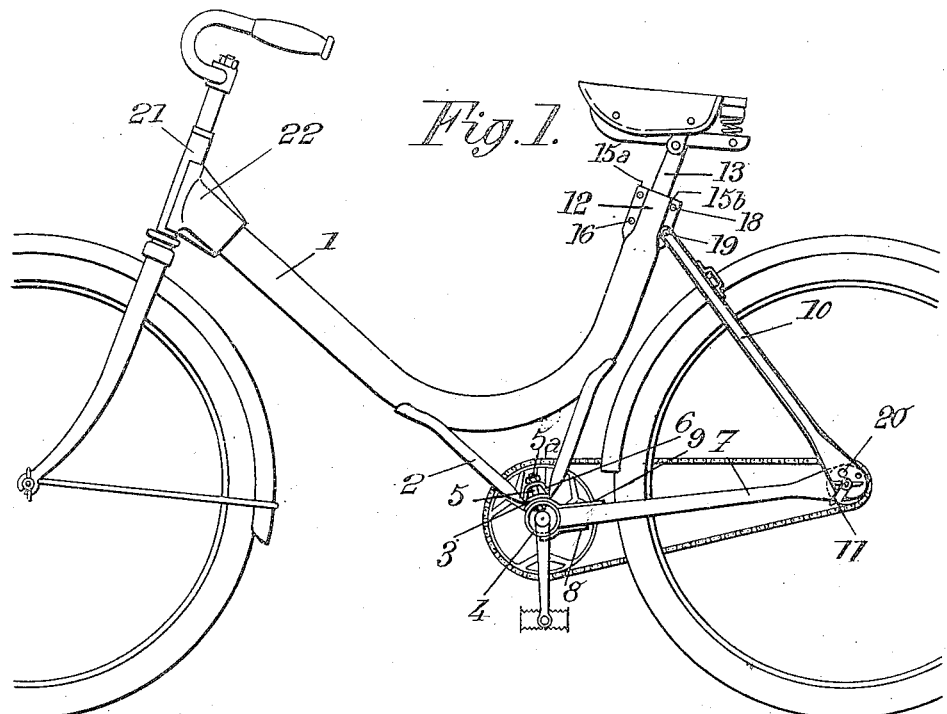
Fig. 1 shows, in diagrammatic elevation, a frame made according to my invention.
Figure 2:
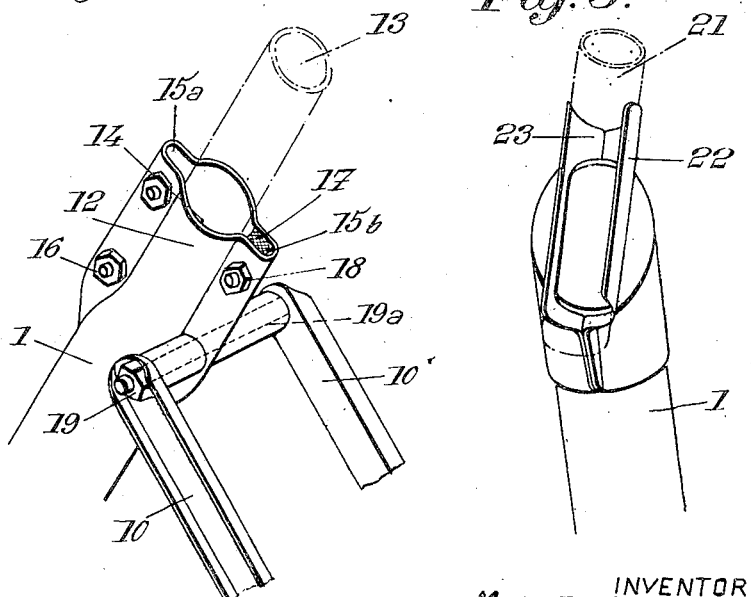
Fig. 2 shows, in perspective view and on a larger scale, the connection between the bent main tube and the strut rods of the rear fork of the frame.

After piece 2 has been fixed to the middle portion of the bent main tube, I flatten the rear end 12 thereof so that it can constitute a housing for the saddle tube 13, shown in dot and dash lines in Fig. 2, this flattening being performed in such manner that, on either side of a circular portion 14 the inner diameter of which corresponds substantially to the outer diameter of saddle tube 13, are provided two hollow flattened portions 15a and 15b having their parallel walls at a distance from each other. Bolts or screws 16, engaged in one (15a) of said hollow portions, make it possible to hold tightly tube 13, whereas the other hollow portion (15b) is preferably fitted with a filling piece 17 held in position by bolts or screws 18.

Advantageously, the rear strut rods 10 are constituted by stampings of U-shaped section the upper ends of which are fixed to the rear end of the main tube 1 by means of a bolt 19, on which are engaged tubes 19a each interposed between one of the lateral faces of the flattened portion 15b of tube 1 and the web of the corresponding strut rod 10.

The wings of the lower ends of struts 10 are flattened or cut away in bevel-like fashion (Fig. 5) so that they can be assembled with the rear ends of rods 7, preferably through small bolts and nuts 20.

In the ends thus connected together are provided slots intended to form the housing 11 of the rear wheel spindle, these slots being preferably substantially at right angles to the direction of struts 10.

I thus obtain a cheap assembly of the pieces that constitute the rear of the frame, this assembly permitting an easy replacement of struts 10 (by removal of the rear wheel, of nuts 20 and of bolt 19) or of pieces 7 and of crank hanger tube 4 (by removal of the rear wheel, of nuts 20 and of bolts 5).

Advantageously, the front part of the bent main tube is connected with the steering head tube 21 (shown in dot and dash lines in Fig. 3) by means of two half shells 22, of stamped sheet metal, which are first electrically spot welded to said end of tube 1. Then the steering head tube is fitted in position by introducing it between the ends 23 of half shells 22. These ends 23 are finally welded to tube 21 through electric spot welding by introducing an electrode into said tube 21.

Hereabove it has been assumed that the frame thus described is intended for a bicycle, but the same features can be applied with the same effects and advantages to the frames of other light vehicles, with or without auxiliary engine.

The component elements of said frame can be manufactured, mounted and assembled in a simple and economical manner. Repairs are easy, relatively cheap and do not require to be executed by specialized labour. It is pointed out that frames obtained through the above described method are sometimes a little heavier than those made by the usual methods but in the particular case of vehicles driven by an auxiliary engine, a small increase of weight, if it corresponds to a substantial reduction of the cost of manufacture is without any importance.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A light vehicle frame which comprises, in combination, an open frame main bent tube, a sheet metal crank hanger support welded to the under side of said tube at the bend thereof, a crank hanger tube carried by said support, the rear end of the main bent tube being partly flattened along the ends of a diameter located in the longitudinal plane of symmetry of said main tube, and rounded between said flattened portions to form a housing for a saddle tube of a diameter smaller than that of said main tube, and two pairs of stamped metal rods of U-shaped section forming respectively the bottom elements and struts of the rear fork, the first pair being fixed at the front end to said crank hanger tube and the second pair at the top end to the rear flattened portion of the rear end of said main tube, the rear ends of said elements being flattened and assembled together, respectivly.

2. A light vehicle frame which comprises, in combination, an open frame main bent tube, a sheet metal crank hanger support welded to the under side of said tube at the bend thereof, a crank hanger tube carried by said support, the rear end of the main bent tube being partly flattened along the ends of a diameter located in the longitudinal plane of symmetry of said main tube, and rounded between said flattened portions to form a housing for a saddle tube of a diameter smaller than that of said main tube, and two pairs of stamped metal rods of U-shaped section forming respectively the bottom elements and struts of the rear fork, the first pair being fixed at the front end to said crank hanger tube and the second pair at the top end to the rear flattened portion of the rear end of said main tube, the rear ends of said elements being flattened and provided with registering notches for the rear wheel hub spindle so as to be assembled together by said spindle engaged in said notches.

3. A light vehicle frame which comprises, in combination, an open frame main bent tube, a V-shaped sheet metal crank hanger support welded to the under side of said tube at the bend thereof, the apex of said V-shaped support including a rounded portion, a crank hanger tube fitted against the outer face of said rounded portion, a spring piece of metal of inverted V section having its edges applied against the inner face of said rounded portion, bolt and nut means between said tube and said spring piece for compressing said piece, the rear end of the main bent tube being partly flattened along the ends of a diameter located in the longitudinal plane of symmetry of said main tube, and rounded between said flattened portions to form a housing for a saddle tube of a diameter smaller than that of said main tube, and two pairs of stamped metal rods of U-shaped section forming respectively the bottom elements and struts of the rear fork, the first pair being fixed at the front end to said crank hanger tube and the second pair at the top end to the rear flattened portion of the rear end of said main tube, the rear ends of said elements being flattened and provided with registering notches for the rear wheel hub spindle so as to be assembled together by said spindle engaged in said notches.

MARCEL MENNESSON.

REFERENCES CITED

The following references are of record in the file of this patent:

UNITED STATES PATENTS

| Number | Name | Date |
| --- | --- | --- |
| 469,630 | Douglas | Feb. 23, 1892 |
| 583,022 | Bolte | May 25, 1897 |
| 589,868 | Spruce et al. | Sept. 14, 1897 |
| 1,907,645 | Glaser | May 9, 1933 |

FOREIGN PATENTS

| Number | Country | Date |
| --- | --- | --- |
| 646,745 | Germany | June 21, 1937 |
| 898,439 | France | July 3, 1944 |